United States Patent
Mizuno

(10) Patent No.: US 9,589,330 B2
(45) Date of Patent: Mar. 7, 2017

(54) IMAGE PROCESSING APPARATUS AND IMAGE PROCESSING METHOD WITH DATA MODIFICATION BASED ON CHANGES IN DATA RANGES

(71) Applicant: CANON KABUSHIKI KAISHA, Tokyo (JP)

(72) Inventor: Ryosuke Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 14/509,019

(22) Filed: Oct. 7, 2014

(65) Prior Publication Data

US 2015/0117776 A1 Apr. 30, 2015

(30) Foreign Application Priority Data

Oct. 30, 2013 (JP) ................................. 2013-225820

(51) Int. Cl.
  *G06K 9/00* (2006.01)
  *G06T 5/00* (2006.01)
  *G09G 5/04* (2006.01)

(52) U.S. Cl.
  CPC .............. *G06T 5/004* (2013.01); *G06T 5/008* (2013.01); *G09G 5/04* (2013.01); *G06T 2207/10024* (2013.01); *G09G 2320/0276* (2013.01); *G09G 2340/02* (2013.01)

(58) Field of Classification Search
  CPC ......... G06T 7/0083; G06T 2207/10024; G06T 2207/20192; G06T 5/001; H04N 19/117; H04N 5/23254
  See application file for complete search history.

(56) References Cited

U.S. PATENT DOCUMENTS 4,878,128 A * 10/1989 Yasumura .............. H04N 5/772
  386/227
2002/0039152 A1* 4/2002 Choi ........................ H04N 5/20
  348/678

FOREIGN PATENT DOCUMENTS

JP 2002-150283 A 5/2002

* cited by examiner

*Primary Examiner* — Eueng-Nan Yeh
(74) *Attorney, Agent, or Firm* — Fitzpatrick, Cella, Harper & Scinto

(57) ABSTRACT

An image processing apparatus includes a processing unit configured to execute image processing on an image signal; a filtering unit configured to execute filtering processing; and a changing unit configured to, in a case where a range of a value which a predetermined color component of the image signal can take is changed from a first range to a second range narrower than the first range by the image processing, change the value of the predetermined color component of the filtered image signal based on the first range and the second range.

10 Claims, 8 Drawing Sheets

IMAGE PROCESSING APPARATUS AND IMAGE PROCESSING METHOD WITH DATA MODIFICATION BASED ON CHANGES IN DATA RANGES

BACKGROUND OF THE INVENTION

Field of the Invention

The present invention relates to an image processing apparatus and image processing method and, more particularly, to a video display technique.

Description of the Related Art

Recently, video display apparatuses such as TV receivers and PC monitors including various display devices, for example, liquid crystal display devices have been put into practical use. A video display apparatus receives video signals of different color components such as R, G, and B signals, performs color adjustment processing such as white balance control and contrast adjustment and various kinds of filtering processing on the video signals, and outputs the processed video signals to a display device, thereby displaying an image.

Typical methods of the filtering processing are temporal spatial frequency separation processing and edge enhancement processing. The "temporal spatial frequency separation processing" is a method which, when dividing the frame period of an input video signal into a plurality of subframe periods, localizes a spatial high-frequency component of a video extracted by using a Gaussian filter or the like into one subframe, and outputs the subframe. This method can reduce a motion blur which is visually recognized in a hold type display device such as a liquid crystal display device.

The "edge enhancement processing" is a process of extracting an edge component by using a differential operation such as Laplacian for each color component of an input video signal, and adds or subtracts the edge component to or from the original video signal, thereby sharpening the video.

On the other hand, when the edge enhancement processing is performed on each color component, a given specific color component is sometimes enhanced more than others depending on the color component balance of a video signal, and as a consequence the tint changes. This phenomenon occurs because especially when a specific color component of a video signal is close to a maximum signal level or minimum signal level, the amount of enhancement of the specific color component is restricted by the output dynamic range, and this makes the tint change conspicuous.

Also, maximum signal levels of R, G, and B defined as white levels are sometimes changed in pre-processing of the edge enhancement processing. Examples are a case in which the tint of the white level is adjusted in white balance control, and a case in which a maximum or minimum signal level which R, G, and B can take is changed in brightness adjustment. The tint changes when the edge enhancement processing is performed on a video signal having undergone this pre-processing for each color component. On the other hand, the brightness is sometimes visually recognized as it has changed beyond the maximum or minimum signal level defined in the pre-processing.

By contrast, a technique which suppresses a change in hue by calculating an amount of enhancement for each color component and applying an amount of enhancement having a minimum absolute value to each color component is known (Japanese Patent Laid-Open No. 2002-150283).

The technique described in Japanese Patent Laid-Open No. 2002-150283 can suppress a change in tint caused by the filtering processing, but the brightness sometimes changes by exceeding the maximum or minimum signal level defined in the pre-processing.

Accordingly, it is necessary to suppress the change in tint caused by the filtering processing, and suppress the change in brightness of the white level caused when the signal level becomes higher than the maximum signal level defined in the pre-processing. It is also necessary to suppress the change in brightness of the black level caused when the signal level becomes lower than the minimum signal level.

SUMMARY OF THE INVENTION

The present invention has been made in consideration of the above problem, and provides a technique capable of further suppressing the change in tint caused by the filtering processing.

According to one aspect of the present invention, an image processing apparatus includes:

a processing unit configured to execute image processing on an image signal;

a filtering unit configured to execute filtering processing; and a changing unit configured to, in a case where a range of a value which a predetermined color component of the image signal can take is changed from a first range to a second range narrower than the first range by the image processing, change the value of the predetermined color component of the filtered image signal based on the first range and the second range.

According to another aspect of the present invention, an image processing method includes:

a processing step of executing image processing on an image signal;

a filtering step of executing filtering processing; and a changing step of, in a case where a range of a value which a predetermined color component of the image signal can take is changed from a first range to a second range narrower than the first range by the image processing, changing the value of the predetermined color component of the filtered image signal based on the first range and the second range.

According to still another aspect of the present invention, a storage medium storing a program for causing a computer to operate as an image processing apparatus, the program includes:

a processing step of executing image processing on an image signal;

a filtering step of executing filtering processing; and a changing step of, in a case where a range of a value which a predetermined color component of the image signal can take is changed from a first range to a second range narrower than the first range by the image processing, changing the value of the predetermined color component of the filtered image signal based on the first range and the second range.

Further features of the present invention will become apparent from the following description of exemplary embodiments (with reference to the attached drawings).

DESCRIPTION OF THE EMBODIMENTS

Embodiments of the present invention will be explained in detail below with reference to the accompanying drawings.

A video display apparatus as an information processing apparatus according to this embodiment receives a video signal containing three color components R (Red), G (Green), and B (Blue), performs various kinds of color adjustment and filtering processing, and outputs the video signal to a display device, thereby displaying a video.

(Functional Configuration of Video Display Apparatus)

Figure 1:
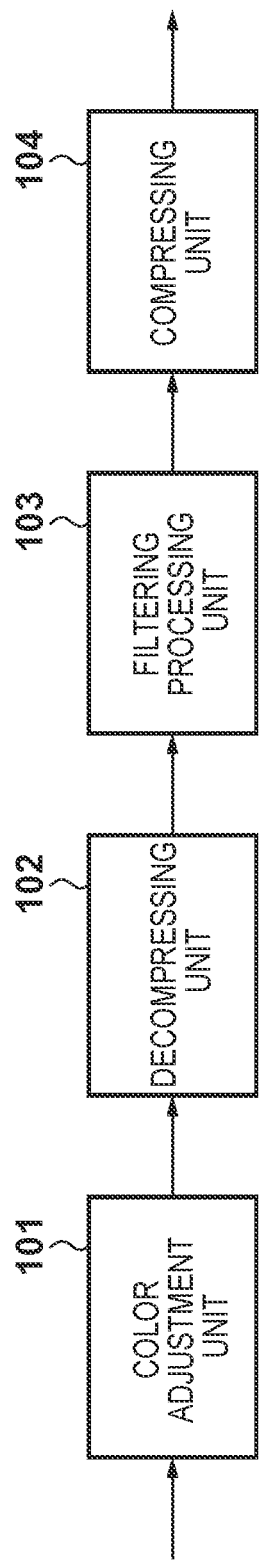
FIG. 1 is a block diagram showing a functional configuration example of a video display apparatus.

FIG. 1 is a block diagram showing a functional configuration example of the video display apparatus according to the embodiment of the present invention. The apparatus includes a color adjustment unit 101, decompressing unit 102, filtering processing unit 103, and compressing unit 104. The color adjustment unit 101 receives a video signal containing three color components R, G, and B, and performs color adjustment such as hue adjustment and brightness adjustment for each color component.

The decompressing unit 102 decompresses the signal level of the color-adjusted video signal for each color component. The decompression method can be either a gain operation or a table operation using an LUT. The decompression degree is decided based on an adjustment value applied for each color component in the color adjustment unit 101. As an example of the decompression degree, maximum and minimum signal levels which the video signal processed by the color adjustment unit 101 can take are determined, and decompressed for each color component to a maximum dynamic range which the filtering processing unit 103 in the output stage of the decompressing unit 102 can take.

The filtering processing unit 103 performs filtering processing on the decompressed video signal for each color component. This filtering processing is, for example, edge enhancement processing. The edge enhancement processing is implemented by extracting a low-frequency component of an original image by using a two-dimensional spatial filter, and adding a difference value from a present image as a high-frequency component to the present image. There is also a method of detecting an edge component by performing a secondary differential operation by using a Laplacian filter, and enhancing the detected edge component. In this embodiment, the edge enhancement processing will be explained as an example of the filtering processing. However, the filtering processing is not limited to the edge enhancement processing, and noise removing processing or smoothing processing using a low-pass filter, or interpolation processing in reduction, enlargement, or deformation processing is also an example of the filtering processing.

The compressing unit 104 compresses the signal level of the filtered video signal for each color component. The compression method can be either a gain operation or a table operation using an LUT. More specifically, it is desirable to set the reciprocal of the decompression degree of the decompressing unit 102.

Note that the video display apparatus as the information processing apparatus according to this embodiment is implemented as a dedicated electronic circuit, but the form of implementation of the video display apparatus is not limited to this. For example, the video display apparatus may also be implemented by a general-purpose information processing apparatus such as a PLD (Programmable Logic Device), personal computer, or workstation.

(Operation Example)

Figure 2:
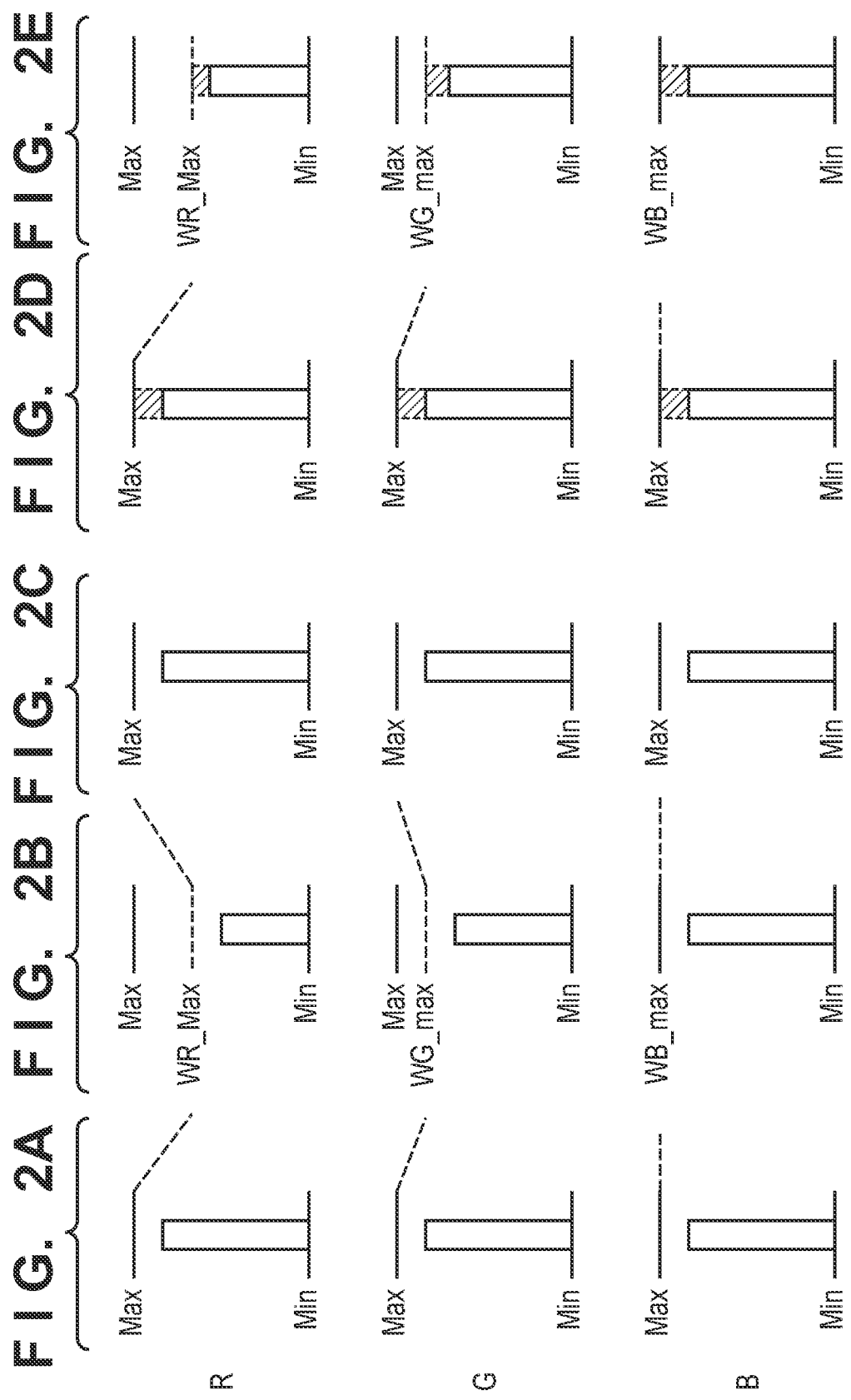
FIGS. 2A, 2B, 2C, 2D, and 2E are views for explaining examples of a video signal level.

An operation example will be explained with reference to FIGS. 2A, 2B, 2C, 2D, and 2E. FIGS. 2A, 2B, 2C, 2D, and 2E are views for explaining examples of the video signal level in this embodiment, and schematically shows the signal levels of R, G, and B. FIG. 2A shows inputs to the color adjustment unit 101, FIG. 2B shows outputs from the color adjustment unit 101, FIG. 2C shows outputs from the decompressing unit 102, FIG. 2D shows outputs from the filtering processing unit 103, and FIG. 2E shows outputs from the compressing unit 104.

In FIGS. 2A, 2B, 2C, 2D, and 2E, Min (0%) and Max (100%) are respectively minimum and maximum signal levels which can be taken by each processing unit. Also, the input video signal level is 80% for all of R, G, and B (FIG. 2A).

Assume that the maximum signal level of an input video signal has reduced at a predetermined ratio in accordance with a color component as a result of white balance control performed by the color adjustment unit 101. The reduction degrees are that the maximum signal level of R is 60% (WR_Max in FIGS. 2A, 2B, 2C, 2D, and 2E), and the maximum signal level of G is 80% (WG_Max in FIGS. 2A, 2B, 2C, 2D, and 2E). Note that B is not adjusted and the maximum signal level of B is 100% (WB Max in FIGS. 2A, 2B, 2C, 2D, and 2E). In this case, white balance control further narrows the ranges of values which R and G of the input video signal can take.

The decompressing unit 102 decompresses, for each color component, the maximum signal level after the white balance control to a maximum dynamic range which the color adjustment unit 101 can take, or to a maximum dynamic range which the filtering processing unit 103 can take. More specifically, when the input dynamic ranges of the color adjustment unit 101 and filtering processing unit 103 are the same, the signal level of R is multiplied by (100/60), and the signal level of G is multiplied by (100/80). These magnifications are respectively equivalent to (Max/WR_Max) times and (Max/WG_Max) times. For example, the gain value is multiplied by (Max/WR_Max) for R, but the value is desirably once or more and (Max/WR_Max) times or less. The decompressing unit 102 widens the range of values which can be taken by each color component of an image signal.

The filtering processing unit 103 performs the edge enhancement processing on the video signal decompressed by the decompressing unit 102. Each hatched level shown in FIG. 2D is the amount of enhancement added as a result of the edge enhancement processing. In this example, all of R, G, and B are clipped by the maximum signal level.

The compressing unit 104 compresses the edge-enhanced video signal levels in accordance with the decompression degrees in the decompressing unit 102. More specifically, the decompression degrees need only be calculated backward, so the signal level of R is multiplied by (60/100), and the signal level of G is multiplied by (80/100). These magnifications are respectively equivalent to (WR_Max/Max) times and (WG_Max/Max) times. As shown in FIG. 2E, as a result of the compression, the edge enhancement processing is performed on the input video signal within the range not exceeding the maximum signal level defined by the white balance control.

As described above, in the information processing apparatus of this embodiment, the signal level of a video signal is decompressed at a predetermined ratio for each color component, filtering processing is performed on the decompressed video signal, and the signal level of the video signal is compressed at a predetermined ratio for each color component. Especially in this embodiment, the decompression and compression ratios of a video signal are predetermined for each color component of the video signal so as to decrease a change in tint of the video signal caused by the filtering processing. More specifically, the decompression and compression ratios are determined for each color component, based on the dynamic range of the signal level of the video signal having undergone color adjustment in the color adjustment unit 101, and the dynamic range of the signal level to be handled by the filtering processing unit 103. In this embodiment, therefore, a video signal having undergone the white balance control does not exceed the maximum signal level for each color component of the signal, so the change in tint can be suppressed.

Figure 3:
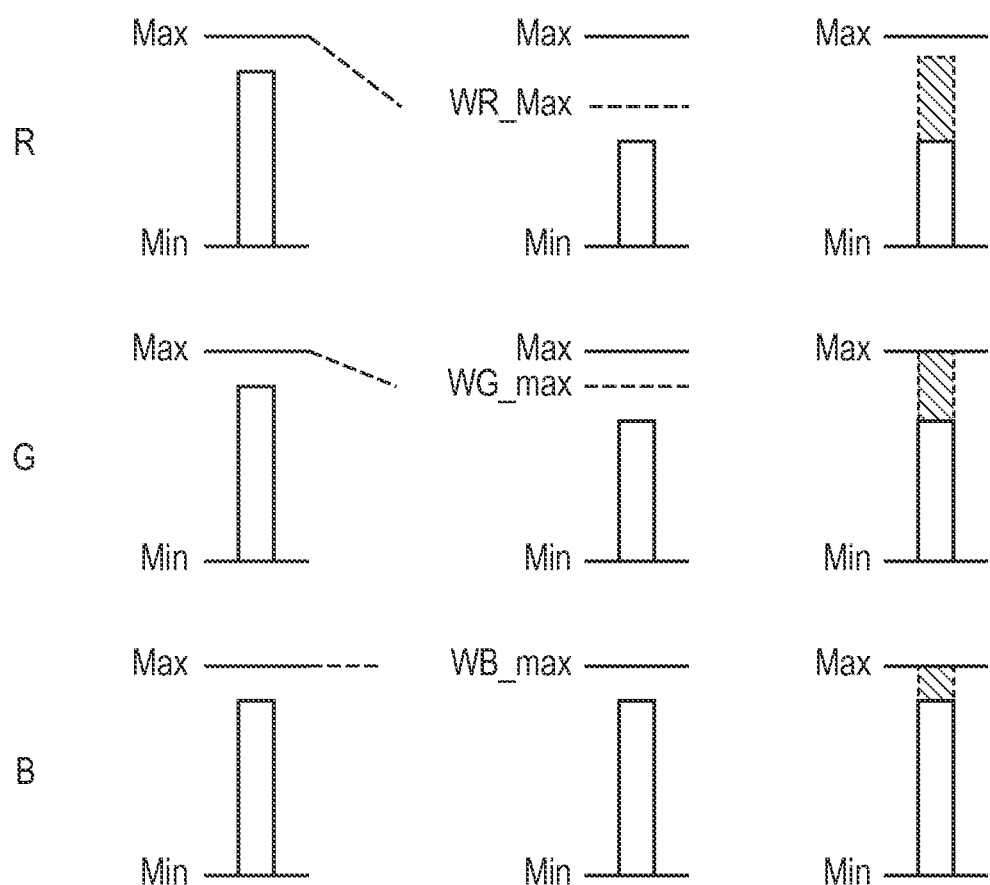
FIGS. 3A, 3B, and 3C are views for explaining a problem to be solved by the video display apparatus.

FIGS. 3A, 3B, and 3C are a view for explaining a problem when the signal level is neither decompressed nor compressed for each color component before and after the filtering processing. FIGS. 3A, 3B, and 3C schematically show the signal levels of R, G, and B when the filtering processing is performed after the white balance control is performed. FIG. 3A shows input signal levels to the white balance control, and FIG. 3B shows output signal levels from the white balance control. FIGS. 3A and 3B are respectively the same as FIGS. 2A and 2B, so an explanation thereof will be omitted. FIG. 3C shows signal levels when the edge enhancement processing is performed on the output signal from the white balance control.

Since the dynamic range in the filtering processing unit 103 is wider than the dynamic range reduced by the white balance control, a case in which the signal level exceeds the maximum signal level defined in the white balance control occurs. FIG. 3C shows an example in which the edge-enhanced signal exceeds the maximum signal level after the white balance control for each of R and G. Also, the degree of excess changes from one color component to another, so the amount of enhancement may largely change from one color component to another.

On the other hand, in the arrangement of this embodiment, the signal level is decompressed and compressed for each color component before and after the filtering processing in accordance with the dynamic range after the color adjustment as explained with reference to FIGS. 2A, 2B, 2C, 2D, and 2E. In the arrangement of this embodiment, therefore, the filtering processing is performed within the range not exceeding the maximum signal level defined by the white balance control. This makes it possible to reduce a change in brightness of the white level caused by the filtering processing, particularly, a change in brightness caused by exceeding the level defined by the white balance control. It is also possible to reduce a change in tint because the differences produced between the degrees of enhancement of the color components by the filtering processing decrease.

In the above explanation, the maximum signal level is decompressed and compressed by a gain operation. However, the minimum signal level can be processed in the same manner. For example, when an offset is added to the black level in the color adjustment, the black level need only be decompressed to the Min (0%) level.

(Procedure)

Figure 4:
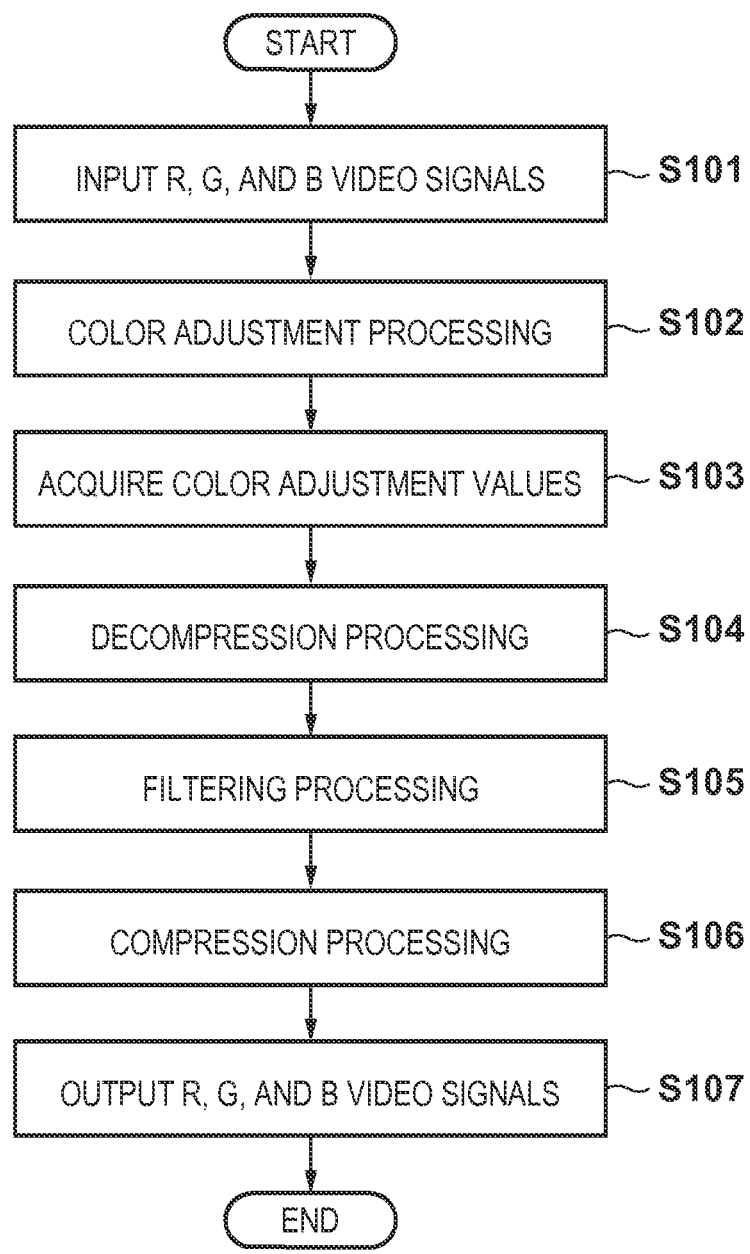
FIG. 4 is a flowchart showing a procedure performed by the video display apparatus.

Next, processing executed by the video display apparatus according to this embodiment will be explained with reference to FIG. 4. FIG. 4 is a flowchart showing an example of the processing in this embodiment.

First, a video signal containing three color components R, G, and B are input for each pixel (step S101), and color adjustment processing is performed for each color component (step S102). Then, color adjustment values in the color adjustment processing are acquired (step S103), an decompression processing is performed for each color component in accordance with the color adjustment value (step S104). For example, if a maximum signal level to be output in the color adjustment processing changes from one color component to another, this maximum signal level is acquired for each color component in step S103. In step S104, decompression is performed by a gain operation such that each acquired maximum signal level becomes a maximum signal level which the input video signal can take.

Filtering processing such as edge enhancement processing is performed on the decompressed video signal (step S105), and compression processing is performed after that for each color component in accordance with the color adjustment value (step S106). For example, the compression processing is performed by a gain operation using the reciprocal of the gain value set in the decompression processing in step S104. After that, video signals of R, G, and B are output for each pixel (step S107). The compressed video signals are output to a display device such as a liquid crystal panel. The above process is repetitively executed for each pixel or each frame, and terminated.

In this embodiment as described above, in the arrangement which performs predetermined signal processing on a video signal containing a plurality of color components, color adjustment is performed on the video signal for each color component, and a change in dynamic range of the video signal caused by this color adjustment is compensated for for each color component. Accordingly, it is possible to suppress a change in tint caused by mismatching between the dynamic ranges of signals in pre-processing such as the color adjustment and signal processing such as the filtering processing.

Note that a gain operation is taken as an example of the decompression method, but the decompression method is not limited to this. For example, nonlinear decompression may also be performed for each representative point of the signal level in a table operation using an LUT. It is also possible to previously execute, in the decompressing unit 102, gamma conversion processing by which a linear characteristic is obtained for a luminance to be displayed. That is, the gamma conversion processing may also be performed on a video signal such that the signal level of the video signal has a linear characteristic with respect to the luminance of a display output of the display apparatus. Consequently, the filtering process can be performed in a space which is linear to the luminance to be displayed.

Furthermore, the explanation has been made by using the three color components R, G, and B, but the present invention is not limited to this. That is, it is also possible to process a video signal containing a plurality of arbitrary color components such as (L, a, b) or (Y, U, V). Furthermore, it is possible to decompose a video signal into a luminance component and color component, and process each signal level after that.

In this embodiment as described above, it is possible to suppress a change in tint caused by the filtering processing, and a change in brightness of the white level caused when the signal level becomes higher than the maximum signal level defined in pre-processing. Similarly, it is possible to suppress a change in brightness of the black level caused when the signal level becomes lower than the minimum signal level.

Another embodiment will be explained by taking, as an example, a case in which "temporal spatial frequency separation processing" is applied as filtering processing. As explained in BACKGROUND OF THE INVENTION, the "temporal spatial frequency separation processing" is a process of outputting an image of each input frame as N (N≥2) subframe images, thereby outputting N subframe images within one frame period. In the "temporal spatial frequency separation processing", it is possible to obtain an output frame rate which is N times an input frame rate. During this process, a motion blur is improved by localizing a high-frequency component affecting the motion blur to a given subframe. Most of the arrangement of this embodiment is the same as the arrangement of the above described embodiment, so differences will mainly be explained.

Figure 5:
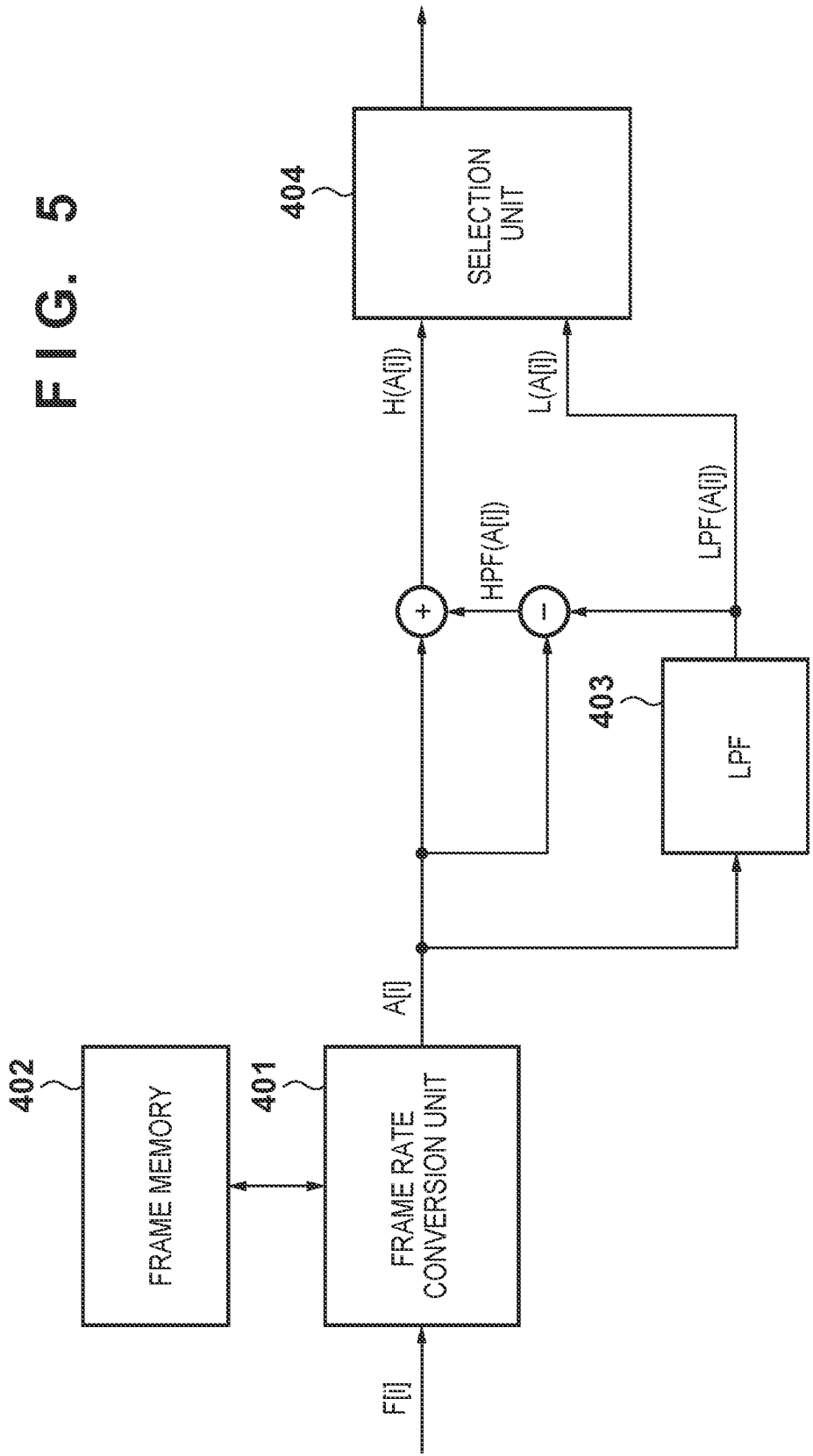
FIG. 5 is a view showing a functional configuration example of a filtering processing unit.

FIG. 5 is a view showing a functional configuration example of a filtering processing unit 103 according to this embodiment. A frame rate conversion unit 401 stores an output from a decompressing unit 102 in a frame memory 402, and reads out an image A[i] at, for example, a frame rate twice an input frame rate, and an LPF 403 generates a low-pass image LPF (A[i]). The low-pass image LPF (A[i]) is generated by performing, for example, low-pass filtering processing based on a Gaussian function on the image A[i]. Then, a high-frequency-component-enhanced image H (A[i]) and low-frequency-component image L (A[i]) are generated based on the image A[i] and low-pass image LPF (A[i]), and a selection unit 404 alternately selectively outputs the images for each subframe. The integral value of the display luminance in two subframe periods is desirably equal to the integral luminance value when displaying the image A[i] in two subframe periods. Therefore, the high-frequency-component-enhanced image H (A[i]) and low-frequency-component image L (A[i]) are generated in accordance with, for example, equations (1) and (2) below:

$$H(A[i]) = A[i] + HPF(A[i]) \quad (1)$$

$$L(A[i]) = LPF(A[i]) \quad (2)$$

Note that an enhancement amount HPF (A[i]) of the high-frequency component is expressed by:

$$HPF(A[i]) = A[i] - LPF(A[i]) \quad (3)$$

From the foregoing, when frame rate conversion is executed at a double speed, a motion blur can be improved by localizing the high-frequency component affecting the motion blur to one subframe.

When a color adjustment unit 101 changes a maximum signal level by, for example, white balance control for each color component, the brightness or tint sometimes changes by exceeding the maximum signal level defined by the white balance control, as in the above described embodiment. An example is a case in which the high-frequency-component-enhanced image H {A[i]} generated by using the low-pass filtering processing result exceeds the maximum signal level defined by the white balance control. As in the above described embodiment, therefore, the brightness change or tint change is reduced by performing compression by the "temporal spatial frequency separation processing" after decompression is performed for each color component. In the "temporal spatial frequency separation processing" when frame rate conversion is performed at a double speed, the decompression degree and compression degree may be determined so as to decrease a fluctuation in color (called an integrated color) integrated within two subframe periods.

Note that the embodiment has been explained by taking double-speed processing as an example, but the present invention is not limited to this. The processing speed can be higher than the double speed, and a generated subframe image can be the linear sum of preceding and succeeding frames. It is also possible to calculate motion vector information, generate an image from preceding and succeeding frames, and apply the generated image as a subframe image. Furthermore, the frame rate conversion unit 401 has been explained as a part of the filtering processing unit 103. However, the effect of this embodiment is obtained even when the frame rate conversion unit 401 is the input stage of the color adjustment unit 101 or decompressing unit 102.

In this embodiment as described above, the frame period of an input video signal is converted into a plurality of subframe periods, and one of an image obtained by enhancing a high-frequency component of the video signal and a low-frequency-component image of the video signal is selected for each subframe period. Therefore, this embodiment can improve a motion blur. Also, in this embodiment, the ratios of decompression and compression of the signal level of a video signal are predetermined for each color component of the video signal so as to decrease a change in integrated color in a plurality of subframe periods. This makes it possible to suppress a change in tint caused by mismatching between the dynamic ranges of signals in pre-processing such as the color adjustment and signal processing such as the filtering processing.

In this embodiment as described above, in the "temporal spatial frequency separation processing", it is possible to suppress the change in tint caused by the filtering processing, and suppress the change in brightness of the white level caused when the signal level becomes higher than the maximum signal level defined in the pre-processing. Likewise, it is possible to suppress the change in brightness of the black level caused when the signal level becomes lower than the minimum signal level. In addition, it is possible to suppress the change in tint caused by the fluctuation in integrated color when the display screen is viewed.

In still another embodiment, an arrangement which further suppresses a change in tint caused when the intensity of filtering processing changes from one color component to another will be explained. This embodiment will be explained by taking, as an example, a case in which "temporal spatial frequency separation processing" is applied as the filtering processing. Most of the arrangement of this embodiment is the same as the arrangements of the above described embodiments, so differences will mainly be explained.

Figure 6:
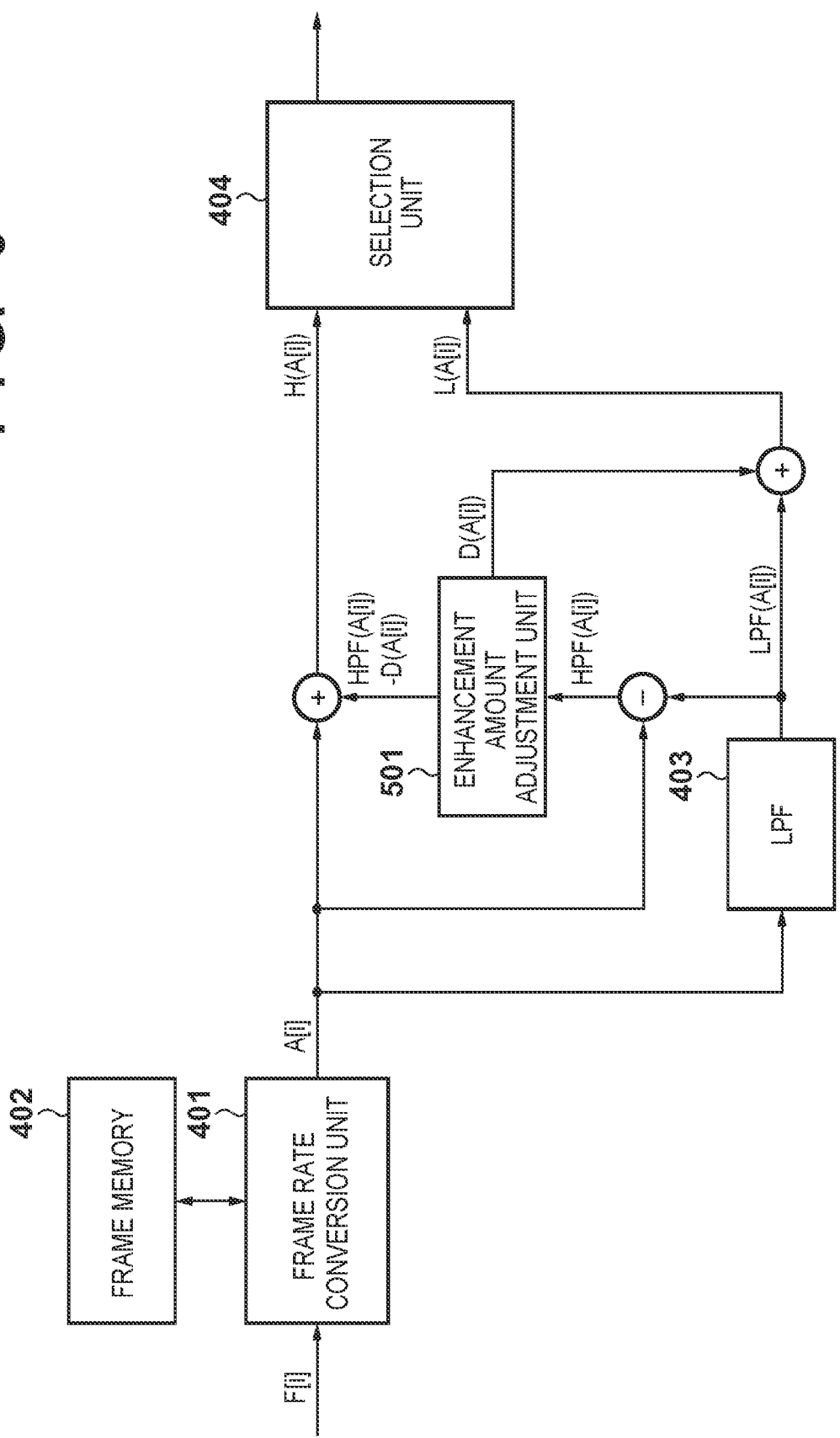
FIG. 6 is a view showing a functional configuration example of a filtering processing unit.

FIG. 6 is a view showing a functional configuration example of a filtering processing unit 103 according to this embodiment. The same reference numerals as in the functional configuration example shown in FIG. 5 denote the same functional elements. An enhancement amount adjustment unit 501 determines whether the absolute values of difference values between color components of enhancement amounts HPF (A[i]) calculated for the color components are equal to or smaller than a predetermined threshold.

The difference values between the color components are difference values of the enhancement amounts HPF (A[i]) between R and G, G and B, and B and R. If the difference value exceeds the predetermined threshold, the enhancement amount adjustment unit 501 reduces the enhancement amount HPF (A[i]) of the color component having a large absolute value so that the absolute value becomes equal to or smaller than the threshold. Letting D (A[i]) (signed) be the reduction amount, a high-frequency-component-enhanced image H (A[i]) and low-frequency-component image L (A[i]) in this embodiment are generated in accordance with, for example, equations (4) and (5):

$$H(A[i])=A[i]+(HPF(A[i])-D(A[i])) \quad (4)$$

$$L(A[i])=LPF(A[i])+D(A[i]) \quad (5)$$

Note that the above-described threshold need only be decided so as to reduce a change in tint caused when the intensity of the filtering processing changes at particularly an intermediate signal level. For example, the amounts of enhancement of the color components have the same value when threshold=0. Also, when calculating the difference value between the enhancement amounts HPF (A[i]) of the color components, it is favorable to apply a value obtained by performing a gain operation on the enhancement amount HPF (A[i]) by using a predetermined gain value for each color component. Note that the predetermined gain value is decided in accordance with the compression degree in a compressing unit 104 in the output stage. This makes comparison with the threshold possible by taking account of the degree of enhancement reduced by compression. Also, in this embodiment, determination is performed based on the difference values between the enhancement amounts HPF (A[i]) of the color components. However, a desired effect can be obtained by performing determination based on modulation amounts before and after the filtering processing.

As described above, the filtering processing unit 103 performs the filtering processing on a video signal having a decompressed signal level for each color component. A modulation amount to be applied to each color component of the video signal in this filtering processing is decided so that the difference values between adjustment amounts of the color components in the filtering processing fall within a predetermined range. Accordingly, this embodiment can suppress a change in tint caused by mismatching between the dynamic ranges of signals in pre-processing such as color adjustment and signal processing such as filtering processing.

In this embodiment as described above, in the "temporal spatial frequency separation processing", it is possible to suppress the change in tint caused by the filtering processing, and suppress the change in brightness of the white level caused when the signal level becomes higher than the maximum signal level defined in the pre-processing. Similarly, it is possible to suppress the change in brightness of the black level caused when the signal level becomes lower than the minimum signal level. In addition, it is possible to suppress the change in tint caused by the fluctuation in integrated color when the display screen is viewed. Furthermore, it is possible to suppress the change in tint caused when the intensity of the filtering processing changes from one color component to another.

In yet another embodiment, an arrangement which reduces a change in tint and a change in brightness caused by filtering processing will be explained. In this embodiment, an arrangement in which clip processing is performed for each color component inside a filtering processing unit 103 instead of adjusting the dynamic range of a signal by a decompressing unit 102 and compressing unit 104 will be explained. More specifically, the arrangement of this embodiment reduces a change in tint and a change in brightness which are readily enhanced by color adjustment performed as pre-processing of the filtering processing, and reduces a change in tint which is readily visually recognized when the intensity of the filtering processing changes from one color component to another. The embodiment will be explained by taking a case in which "temporal spatial frequency separation processing" is applied as the filtering processing as an example.

(Functional Configuration of Video Display Apparatus)

Figure 7:
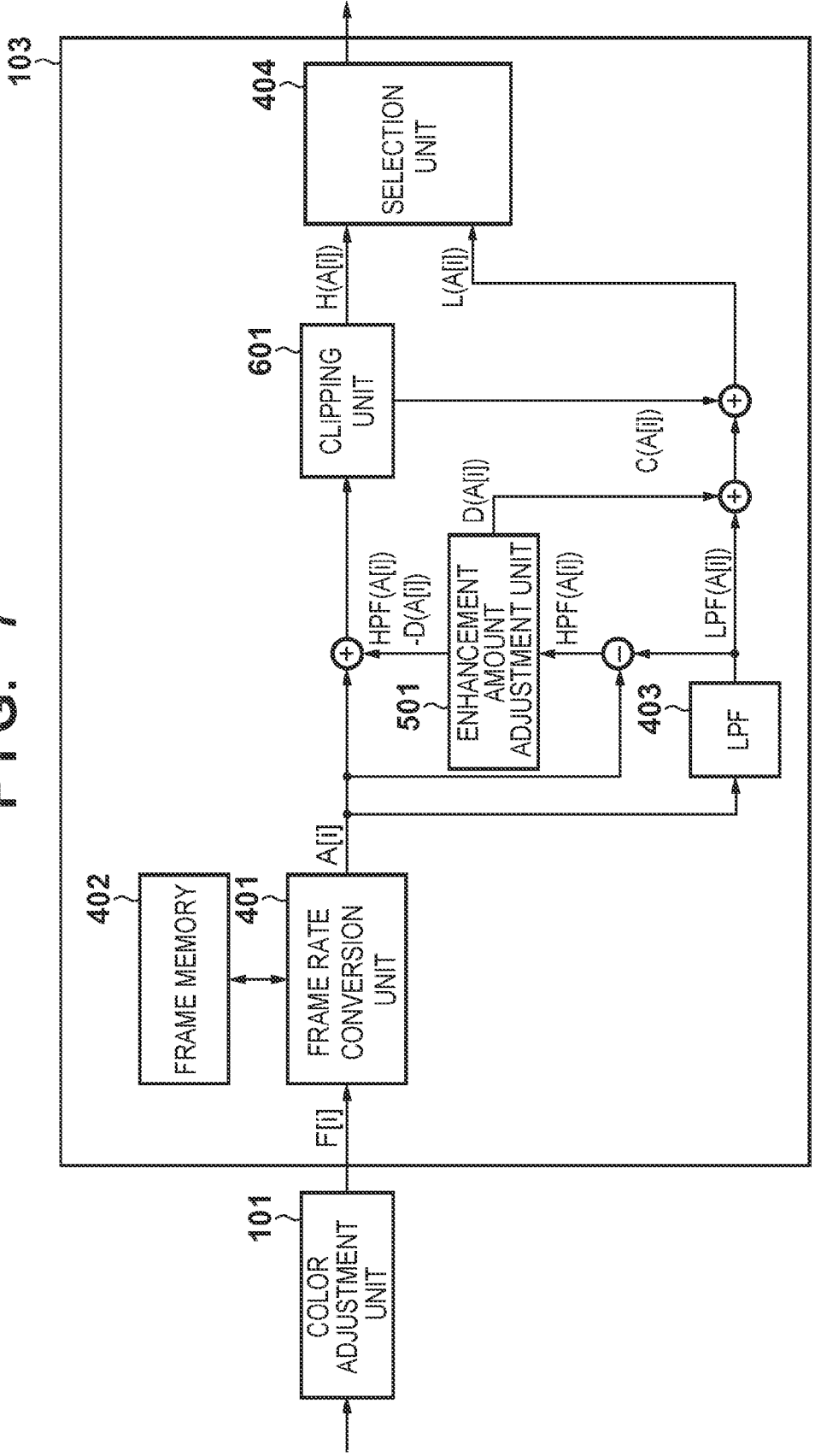
FIG. 7 is a block diagram showing a functional configuration example of a video display apparatus.

FIG. 7 is a block diagram showing a functional configuration example of a video display apparatus according to this embodiment. The same reference numerals as in the functional configuration examples shown in FIGS. 1, 5, and 6 denote the same functional elements.

A clipping unit 601 performs, for each color component, the clip processing on the output dynamic range of a high-frequency-component-enhanced image H (A[i]) calculated by using equation (4) described above. More specifically, the clipping unit 601 acquires maximum and minimum signal levels defined by a color adjustment unit 101 for each color component, and decides a clip level in accordance with the acquired levels. For the maximum signal level, for example, the acquired level can directly be used as the clip level, and the clip level is desirably higher than the acquired level and lower than the maximum signal level which can be output by the filtering processing unit 103. For the minimum signal level, the acquired signal level can directly be used as the clip level, and the clip level is desirably lower than the acquired level, and higher than the minimum signal level which can be output by the filtering processing unit 103. Letting C (A[i]) be the clip level (signed), the high-frequency-component-enhanced image H (A[i]) and a low-frequency-component image L (A[i]) to be selectively output from a selection unit 404 are generated in accordance with, for example, equations (6) and (7) below:

$$H(A[i])=A[i]+HPF(A[i])-D(A[i])-C(A[i]) \quad (6)$$

$$L(A[i])=LPF(A[i])+D(A[i])+C(A[i]) \quad (7)$$

Note that the above equations are applied for each color component. In addition, the degrees of clipping can be made equal between the color components by applying one of the clip levels C (A[i]) of the color components, which has a maximum absolute value, for each color component. Furthermore, whether the absolute values of difference values of the clip levels C (A[i]) between the color components are equal to or smaller than a predetermined threshold is determined. If the absolute value exceeds the predetermined threshold, it is possible to increase the value of a color component, for which the absolute value of the clip level C (A[i]) is small, so that the absolute value is equal to or smaller than the threshold.

It is also possible to determine the clip processing for each color in an enhancement amount adjustment unit 501. Furthermore, the processing of the filtering processing unit 103 is sometimes performed in a space which is linear to a luminance to be displayed, that is, gamma conversion processing taking account of the gamma of a display system is sometimes performed in the input stage of the filtering processing unit 103. When the gamma conversion processing is performed in the output stage of the color adjustment unit 101, the gamma conversion processing may be performed on the maximum and minimum signal levels acquired from the color adjustment unit 101.

(Procedure)

Figure 8:
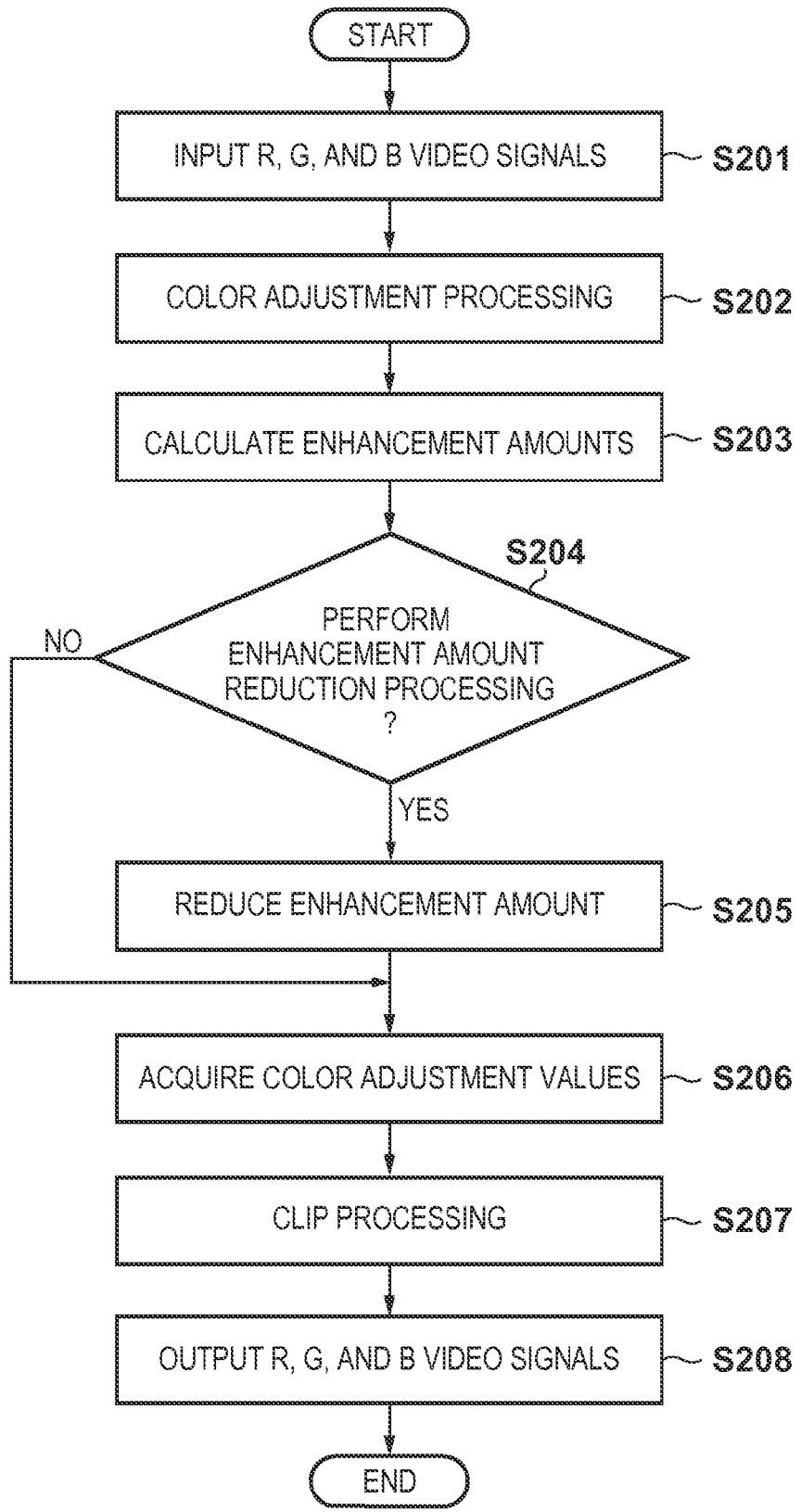
FIG. 8 is a flowchart showing a procedure performed by the video display apparatus.

Next, an example of processing according to this embodiment will be explained with reference to a flowchart. FIG. 8 is a flowchart showing the example of the processing according to this embodiment. First, a video signal containing three color components R, G, and B is input for each pixel (step S201), and color adjustment processing is performed for each color component (step S202). After that, frame rate conversion is performed at, for example, a double speed, and an enhancement amount HPF (A[i]) is calculated for each color component based on equation (3) (step S203). Whether the absolute values of the difference values between the enhancement amounts HPF (A[i]) of the color components are larger than a predetermined threshold is determined (step S204). If it is determined that the absolute value is larger than the threshold, the enhancement amount HPF (A[i]) to be added to the high-frequency-component-enhanced image H (A[i]) is reduced based on, for example, equation (4), such that the enhancement amount HPF (A[i]) of the color component having a large absolute value becomes equal to or smaller than the threshold (step S205). On the other hand, in accordance with the reduction amount, the low-frequency-component image L (A[i]) is corrected based on, for example, equation (5). Then, a color adjustment value in the color adjustment processing is acquired (step S206), and the clip processing is performed for each color component in accordance with the color adjustment value (step S207). For example, if a maximum signal level output in the color adjustment processing changes from one color component to another, the maximum signal level is acquired for each color component, and the high-frequency-component-enhanced image H (A[i]) is reduced based on, for example, equation (6). On the other hand, in accordance with the reduction amount, the low-frequency-component image L (A[i]) is corrected based on, for example, equation (7). After that, the video signals of R, G, and B are output for each pixel (step S208). The above processing is repetitively executed for each pixel or each frame.

In this embodiment as described above, instead of the decompressing unit 102 and compressing unit 104, the signal level of a video signal having undergone the filtering processing is clipped for each color component such that the signal level falls within the predetermined dynamic range, thereby compensating for, for each color component, the change in dynamic range of the video signal caused by color adjustment in the color adjustment unit 101. The dynamic range after the clip processing is determined for each color component based on the dynamic range of the signal level of the color-adjusted video signal. Therefore, it is possible to suppress a change in tint caused by mismatching between the dynamic ranges of signals in pre-processing such as color adjustment and signal processing such as filtering processing. Note that "temporal spatial frequency separation processing" in which the frame period of an input video signal is converted into a plurality of subframe periods and one of an image obtained by enhancing a high frequency component of the video signal and a low-frequency-component image is selected for each subframe period is performed in this embodiment as well. Therefore, a motion blur can be improved.

In this embodiment as described above, in the "temporal spatial frequency separation processing", it is possible to suppress the change in tint caused by the filtering processing, and suppress the change in brightness of the white level caused when the signal level becomes higher than the maximum signal level defined in the pre-processing. Similarly, it is possible to suppress the change in brightness of the black level caused when the signal level becomes lower than the minimum signal level. In addition, it is possible to suppress the change in tint caused by the fluctuation in integrated color when the display screen is viewed. Furthermore, it is possible to suppress the change in tint caused when the intensity of the filtering process changes from one color component to another.

Although the plurality of embodiments have been explained above, various changes can be made in the above-described embodiments without departing from the spirit of the present invention.

"Edge enhancement processing" and "temporal spatial frequency separation processing" have been explained as the filtering processing, but the present invention is not limited to applications to these processes. For example, the present invention is also applicable to filtering processing using a spatial filter.

Also, the explanation has been made by using the three color components R, G, and B, but the present invention is not limited to this. It is also possible to process a video signal containing a plurality of color components, or decompose a video signal into a luminance component and color components and process the signal level of each component. Furthermore, the method of acquiring the color adjustment values such as the maximum and minimum signal levels in color adjustment is not limited to the above-mentioned method. For example, it is also possible to acquire the maximum and minimum signal levels for each frame by analyzing the color-adjusted image.

The present invention can provide a technique capable of further suppressing a change in tint caused by filtering processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processing units. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-225820, filed on Oct. 30, 2013 which is hereby incorporated by reference herein in its entirety.

What is claimed is:

1. An image processing apparatus comprising:
   a processing unit configured to execute image processing on an input image signal;
   a first changing unit configured to, when a range of which a value of a predetermined color component among a plurality of color components corresponding to the input image signal can take is changed from a first range to a second range narrower than the first range by the image processing by the processing unit, increase, based on the first and second ranges, a value of the predetermined color component of the processed image signal which is obtained based on the image processing on the input image signal;
   a filtering unit configured to execute filtering processing on a first changed image signal obtained by the first changing unit;
   a second changing unit configured to decrease, based on the first and second ranges, a value of the predetermined color component of the filtered image signal obtained by the filtering processing on the first changed image signal by the filtering unit; and
   an output unit configured to output a second changed image signal obtained by the second changing unit.

2. The apparatus according to claim 1, wherein when the value which the predetermined color component can take is changed from the first range to the second range by the image processing, the first changing unit increases the value of the predetermined color component of the input image signal based on the first range and the second range before the filtering processing, and wherein the second changing unit decreases the value of the predetermined color component of the filtered image signal based on the first range and the second range.

3. The apparatus according to claim 1, wherein the processing unit performs control to make a reduction amount of the value of the predetermined color component of the input image signal larger when a difference between the first range and the second range is larger than a threshold, than when the difference between the first range and the second range is smaller than the threshold, and
   the first changing unit performs control to make a reduction amount of the value of the predetermined color component of the filtered image signal larger when the difference between the first range and the second range is larger than the threshold, than when the difference between the first range and the second range is smaller than the threshold.

4. The apparatus according to claim 1, wherein the processing unit executes white balance control processing on the input image signal.

5. The apparatus according to claim 1, wherein the filtering unit executes the filtering processing for generating the filtered image signal having a predetermined frequency component from the first changed image signal having undergone the image processing.

6. An image processing method comprising:
   executing image processing on an input image signal;
   increasing, when a range of which a value of a predetermined color component among a plurality of color components corresponding to the input image signal can take is changed from a first range to a second range narrower than the first range by the image processing, based on the first and second ranges, a value of the predetermined color component of the processed image signal which is obtained based on the image processing on the input image signal;
   executing filtering processing on a first changed image signal obtained in the increasing;
   decreasing, a value of the predetermined color component of the filtered image signal obtained by the filtering processing on the first changed image signal in the filtering; and
   outputting a second changed image signal obtained in the decreasing.

7. The method according to claim 6, wherein when the value which the predetermined color component can take is changed from the first range to the second range by the image processing, in the increasing, the value of the predetermined color component of the input image signal is increased based on the first range and the second range before the filtering processing and, in the decreasing, the value of the predetermined color component of the filtered image signal is decreased based on the first range and the second range.

8. The method according to claim 6, wherein in the executing the image processing, control is performed to make a reduction amount of the value of the predetermined color component of the input image signal larger when a difference between the first range and the second range is larger than a threshold, than when the difference between the first range and the second range is smaller than the threshold, and
   in the increasing, control is performed to make a reduction amount of the value of the predetermined color component of the filtered image signal larger when the difference between the first range and the second range is larger than the threshold, than when the difference between the first range and the second range is smaller than the threshold.

9. A non-transitory storage medium storing a program for causing a computer to operate as an image processing apparatus, said program comprising:
   executing image processing on an input image signal;
   increasing, when a range of which a value of a predetermined color component among a plurality of color components corresponding to the input image signal can take is changed from a first range to a second range narrower than the first range by the image processing, based on the first and second ranges, a value of the predetermined color component of the processed image signal which is obtained based on the image processing on the input image signal;
   executing filtering processing on a first changed image signal obtained in the increasing;
   decreasing, a value of the predetermined color component of the filtered image signal obtained by the filtering processing on the first changed image signal in the filtering; and
   outputting a second changed image signal obtained in the decreasing.

10. The non-transitory storage medium according to claim 9, wherein in the executing the image processing, control is performed to make a reduction amount of the value of the predetermined color component of the input image signal larger when a difference between the first range and the second range is larger than a threshold, than when the difference between the first range and the second range is smaller than the threshold, and
    in the increasing, control is performed to make a reduction amount of the value of the predetermined color component of the filtered image signal larger when the difference between the first range and the second range is larger than the threshold, than when the difference between the first range and the second range is smaller than the threshold.

* * * * *